United States Patent
Blatt

[19]

[11] Patent Number: 6,024,392
[45] Date of Patent: Feb. 15, 2000

[54] VACUUM CUP ACTUATOR

[75] Inventor: John A. Blatt, Grosse Pointe Shores, Mich.

[73] Assignee: Isi Norgren, Inc., Mt. Clemens, Mich.

[21] Appl. No.: 08/590,442

[22] Filed: Jan. 23, 1996

[51] Int. Cl.[7] ............................... B25J 15/06; B66C 1/02
[52] U.S. Cl. ........................................... 294/64.1; 294/907
[58] Field of Search ................................. 294/64.1, 64.2, 294/65, 907; 269/21; 271/103, 108; 414/737, 752; 901/40

[56] References Cited

U.S. PATENT DOCUMENTS

| | | | |
|---|---|---|---|
| 1,717,454 | 6/1929 | Kelly | 271/103 |
| 2,341,521 | 2/1944 | Baker et al. | 271/103 |
| 3,568,959 | 3/1971 | Blatt . | |
| 3,702,698 | 11/1972 | Schwebel | 294/64.1 X |
| 3,716,307 | 2/1973 | Hansen . | |
| 4,073,602 | 2/1978 | Cagle . | |
| 4,189,137 | 2/1980 | Denney et al. | 294/64.1 X |
| 4,402,651 | 9/1983 | Ise . | |
| 4,432,701 | 2/1984 | Ise . | |
| 4,561,687 | 12/1985 | Bostrom | 294/64.1 |
| 4,624,456 | 11/1986 | Porat | 271/108 X |
| 4,653,741 | 3/1987 | Palmer | 271/108 X |
| 4,828,306 | 5/1989 | Blatt . | |
| 4,865,521 | 9/1989 | Ise et al. . | |
| 4,950,016 | 8/1990 | Kumar . | |
| 5,188,411 | 2/1993 | Golden . | |
| 5,308,132 | 5/1994 | Kirby et al. | 294/64.1 |
| 5,451,086 | 9/1995 | Pazzaglia | 294/64.1 |

*Primary Examiner*—Johnny D. Cherry
*Attorney, Agent, or Firm*—Young & Basile, P.C.

[57] ABSTRACT

A vacuum cup actuator for applying and releasing vacuum to a workpiece engaging vacuum cup wherein a housing provides a passageway for communicating vacuum to the vacuum cup, and a vacuum is actuated in response to the relative position of the vacuum cup with respect to the housing. A piston is slidably disposed within a stepped bore of the housing, and a valve is slidably disposed within the piston for relative movement therein. A valve cover is connected to the piston and disposed above the valve. The passageway extends through a port provided through a side wall of the housing and extends through the piston and the valve to the vacuum cup. A flexible seal is circumferentially connected to the valve for engaging and disengaging a shoulder of the piston thus closing and opening, respectively, the passageway. A quick connect releasable mount is provided for releasably connecting the vacuum cup to the valve to place the vacuum cup in communication with the passageway. The actuation of the vacuum may be reset and the workpiece released by introducing a pressurized fluid into the passageway for releasing vacuum from the vacuum cup and re-introducing vacuum to the passageway for resetting actuation of the vacuum.

18 Claims, 6 Drawing Sheets

VACUUM CUP ACTUATOR

FIELD OF THE INVENTION

The present invention relates, in general, to vacuum cups and, more specifically, to a vacuum cup actuator for applying and releasing a vacuum to a workpiece engaging vacuum cup.

BACKGROUND OF THE INVENTION

Vacuum cups are commonly employed as workpiece gripping elements to engage and transport workpieces in a manufacturing operation, to load and unload sheet metal parts into and out of a die, or to carry a part, such as an automobile windshield, to the vehicle to which it is to be installed.

Such vacuum cups generally employ a control apparatus for employing a vacuum to the vacuum cup. One such common design for the control apparatus is the use of a venturi passage in a body which is connected to a source of pressurized air. The air flow passes through the venturi passage and induces subatmospheric pressure in the throat of the venturi and in a passage connecting the venturi throat to the interior of the vacuum cup which induces a vacuum within the cup when the cup engages a workpiece surface. Earlier versions of such a vacuum cup control apparatus required that the air continually flow through the venturi passage in order to maintain vacuum in the cup since air at atmospheric pressure was free to flow back through the discharge vent once the air flow was stopped. Such venturi passages are loud, require a large amount of air to maintain the vacuum in the vacuum cup, and must continually operate to maintain vacuum.

Further developments led to the use of one way check valves between the vacuum cup and the venturi passage to seal the vacuum in the vacuum cup, thus allowing vacuum to be maintained within the vacuum cup once air flow is stopped from passing through the venturi passage. Such designs allow for air flow to be stopped but these designs may not compensate for small leaks or loss of vacuum which may occur between or within the vacuum cup and the workpiece. Therefore, the pressure within the vacuum cup must be continually monitored in conjunction with the air flow being intermittently engaged such that vacuum within the vacuum cup is maintained to secure the workpiece to the vacuum cup.

Other designs have utilized a vacuum pump to supply vacuum directly to the vacuum cup. To avoid having the vacuum continually operate, various sensors were developed wherein the sensors sense contact between the vacuum cup and the workpiece. An output signal from the sensor causes vacuum to be applied to the vacuum cup. Such systems typically involve program delays to allow for the vacuum to respond to the signal. In addition, such systems typically require a host of sensors as well as a multitude of programmable electronics which may become expensive and high maintenance items.

In addition, further designs have developed the use of mechanical valves within the vacuum cup. The valves typically utilize a spring biased piston head which directly engages the workpiece. The piston head recedes into the vacuum cup when engaged by the workpiece causing the valve to open. Vacuum is applied to the suction cup through the open valve thus securing the workpiece to the vacuum cup and holding the valve open. When pressurized air is actuated, the pressurized air flows through the open valve until the workpiece is no longer secured to the vacuum cup due to atmospheric pressure in the vacuum cup. The spring biased valve closes, and the piston head helps disengage the workpiece from the vacuum cup. Such mechanical valves require the piston head to directly engage the workpiece without much room for error in the positioning of the vacuum cup. In addition, each vacuum cup requires its own valve thus requiring the costly operation of replacing both the valve and the vacuum cup should the vacuum cup or valve become damaged. Also, such valves do not have the flexibility of utilizing different style vacuum cups with the same valve for different workpiece configurations or applications.

Thus, it would be desirable to provide a vacuum cup actuator that only provides vacuum to the vacuum cup when needed while still accommodating for minor linkages occurring in the vacuum cup. It would also be desirable to provide a vacuum cup actuator that provided immediate vacuum to the vacuum cup so as to eliminate delays for vacuum response. In addition, it would also be desirable to provide a vacuum cup actuator that does not require close positioning tolerances of the automation utilized to manipulate the position of the vacuum cup with respect to the workpiece.

SUMMARY OF THE INVENTION

The present invention provides a vacuum cup actuator for applying and releasing vacuum to a workpiece engaging vacuum cup wherein a housing provides a passageway for communicating vacuum to the vacuum cup, and a vacuum is actuated in response to the relative position of the vacuum cup with respect to the housing. The actuation of vacuum may be reset by introducing a pressurized fluid into the passageway for releasing vacuum from the vacuum cup.

To actuate the vacuum, the vacuum cup actuator provides a valve means that is slidably disposed within the housing for opening and closing the passageway in response to the relevant position of the vacuum cup with respect to the housing created by the vacuum cup engaging a workpiece. The valve means provides a piston that is slidably disposed within the housing, and a valve that is slidably disposed within the piston for relative movement therein. A valve cover is connected to the piston and disposed above the valve. The passageway extends through a port provided through a side wall of the housing and through the piston and the valve to the vacuum cup. A flexible seal is circumferentially connected to the valve for engaging and disengaging a shoulder of the piston thus closing and opening, respectively, the passageway. A quick connect releasable mount is connected to the valve to place the vacuum cup in communication with the passageway and provide a quick method of replacing or interchanging vacuum cups.

The vacuum cup actuator also provides a pressure sensor for sensing the pressure realized by the vacuum cup. The pressure sensor may be disposed within a recess provided in the valve cover. Alternatively, the pressure sensor may be mounted to the valve cover or at a location away from the vacuum cup actuator where the pressure sensor may be placed in remote communication with the valve cover recess to sense the pressure within the valve cover recess. The signal generated by the pressure sensor is sent to a control means to monitor and adjust the vacuum being applied in the vacuum cup.

The housing of the vacuum cup actuation apparatus may also provide an integral bracket means for mounting the housing to a means for manipulating motion. The bracket means may provide a spherical pivotal mount that is connected to a programmable robotic arm for movement of the vacuum cup actuator.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
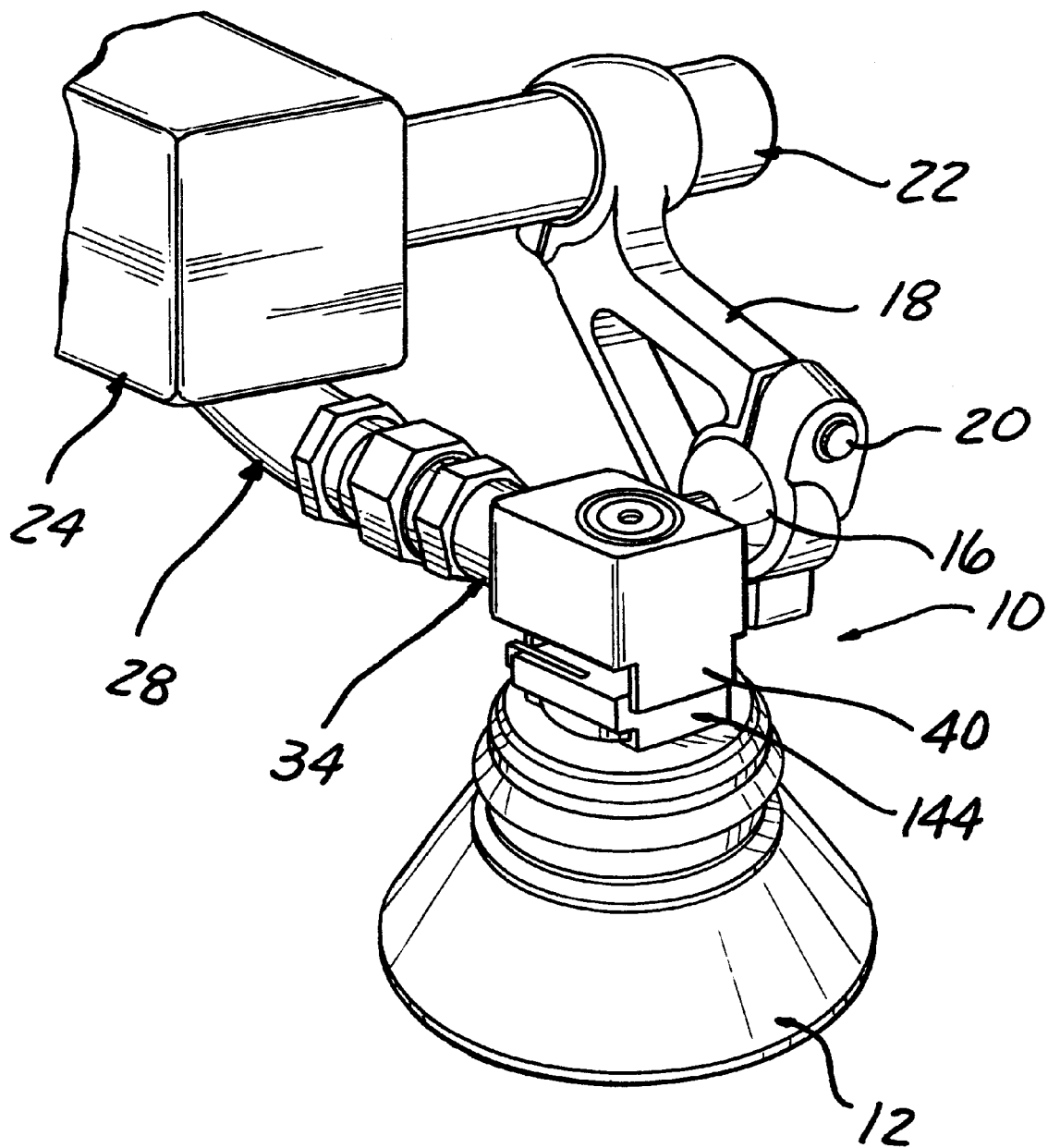
FIG. 1 is a perspective view of a vacuum cup actuator made according to the present invention and shown mounted to a boom of a programmable robotic arm.
Figure 2:
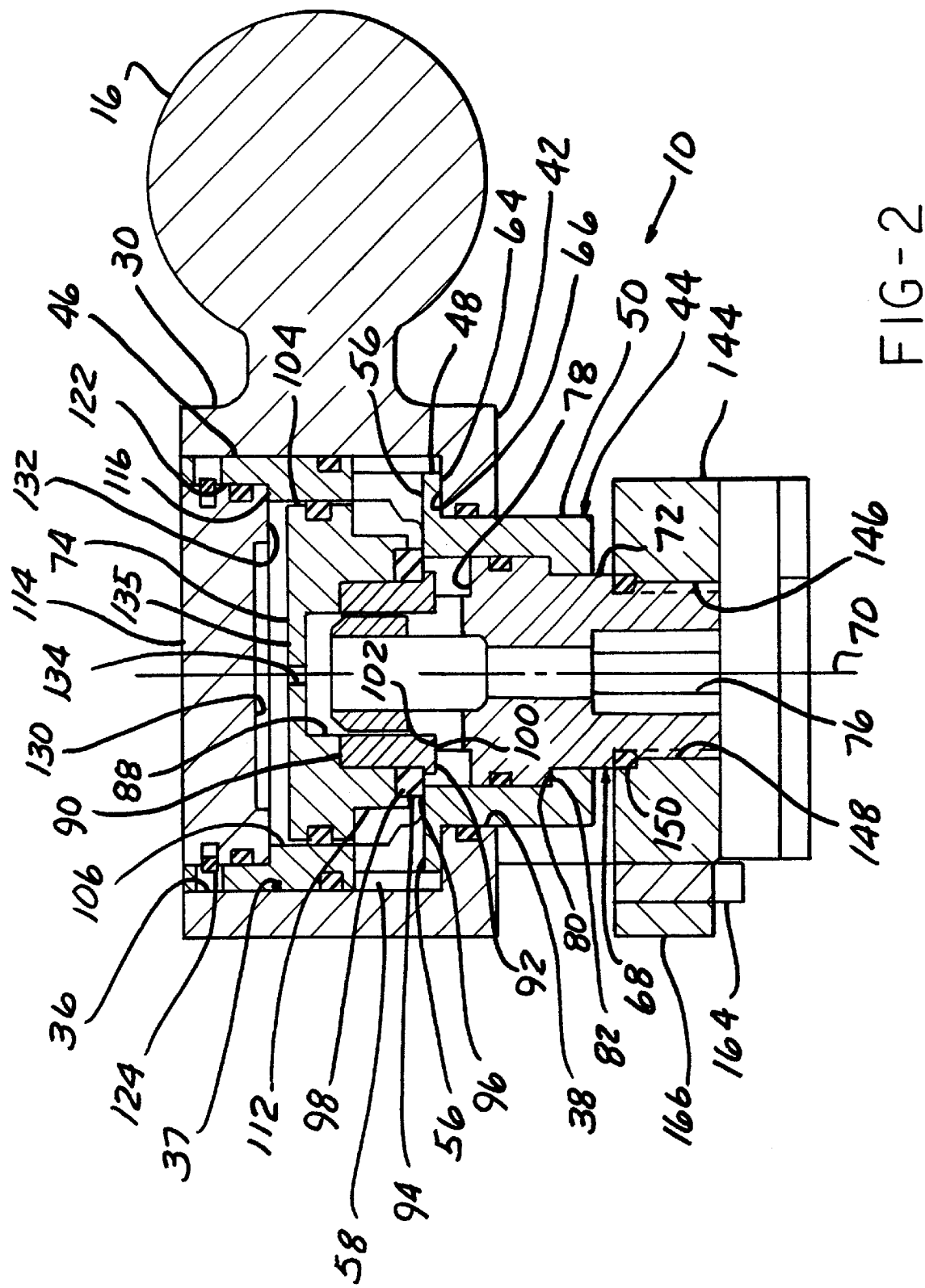
FIG. 2 is a cross-sectional view showing the vacuum cup actuator without a vacuum cup attached.

Referring to the drawings, the present invention will now be described in detail with reference to the preferred embodiment.

FIG. 1 is a perspective view illustrating a vacuum cup actuator 10 for applying and releasing vacuum to a workpiece engaging vacuum cup 12. The vacuum cup actuator 10 provides a housing 14 with an integral bracket means wherein the bracket means may provide a spherical pivotal mount 16 that is integral with and extends outwardly from the housing 14. A conventional spherical bracket 18 adjustably clamps the spherical mount 16 through the use of a threaded fastener 20, and the bracket 18 is connected to a conventional boom 22 of a programmable robotic arm 24. The housing 14 of the vacuum cup actuator 10 provides an inlet port or aperture 26 for receiving a conduit or flexible hose 28. The conduit 28 communicates vacuum or pressurized fluid, such as air, from a source or supply of vacuum or pressurized air (not shown) to the vacuum cup 12.

As seen in FIGS. 1–5, the housing 14 of the vacuum cup actuator 10 is substantially rectangular with the spherical mount 16 extending from a rear wall 30 of the housing 14. In addition, the inlet port or aperture 26 extends through a side wall 32 of the housing 14 for receiving the supply of either vacuum or pressurized air. The inlet port 26 may have a threaded portion (not shown) for threadedly receiving a coupling or fitting 34 to connect the conduit 28 to the housing 14. The inlet port 26 opens into and communicates with a larger bore 36 of a stepped bore 37 extending through the housing 14 substantially normal to the inlet port 26. The inlet port 26 helps define a passageway 39, disposed within the housing 14, for communicating vacuum from the inlet port 26 to the vacuum cup 12. The housing 14 also provides a pair of substantially parallel guide walls 40 which extend from and are integral with a bottom wall 42 of the housing 14. The guide walls 40 are utilized to guide relative movement of the quick connect mounting means with respect to the housing 14.

To actuate the vacuum in response to the relative position of the vacuum cup 12 with respect to the housing 14, a valve means is disposed within the housing 14. The valve means provides a cylindrical piston 44 slidably disposed within the stepped bore 37 of the housing 14. The piston 44 has three outer peripheries or surfaces 46, 48, 50 wherein the largest or first outer periphery 46 of the piston 44 is slightly smaller than the larger bore 36 provided in the housing 14 so as to provide a sliding engagement of the first periphery 46 of the piston 44 with the larger bore 36 of the housing 14. An annular recess 52 is provided in the first periphery 46 of the piston 44, and a flexible O-ring 54 is disposed within the recess 52 to provide a seal between the first periphery 46 of the piston 44 and the surface defining the larger bore 36 of the housing 14.

The second outer periphery or surface 48 of the piston 44 is smaller than the first periphery 46 of the piston 44. The second periphery 48 of the piston 44 may have four apertures 56 equally spaced about its circumference and extending through the piston 44. The second periphery 48 of the piston 44 is smaller in diameter than the larger bore 36 of the housing 14, and thus, the second periphery 48 of the piston 44 opposes the inner surface of the larger bore 36 of the housing 14 to create an annular recess 58 for communicating vacuum or pressurized air through the inlet port 26 of the housing 14 to the four apertures 56 provided in the second periphery 48 of the piston 44.

The third and smallest periphery 50 of the piston 44 is slightly smaller in diameter than the smaller bore 38 of the housing 14 so that the third periphery 50 of the piston 44 has a sliding engagement with respect to the smaller bore 38 of the housing 14. The smaller bore 38 of the housing 14 has an annular recess 60 wherein a flexible O-ring 62 is seated to provide a seal between the surface defining the smaller bore 38 of the housing 14 and the third periphery 50 of the piston 44. In addition, the bottom surface 64 of the second periphery 48 of the piston 44 abuts an inwardly extending portion 66 of the housing 14 defining the smaller bore 38 of the housing 14. The abutting surfaces 64, 66 limit the travel of the piston 44 and prohibit the piston 44 from extending beyond the bottom of the housing 14.

To open and close the passageway 39, the valve means provides a valve 68 slidably disposed within the piston 44. The piston 44 provides a stepped bore extending therethrough along a longitudinal axis 70. The valve 68 has a valve stem 72 and a valve head 74 wherein the valve stem 72 and the valve head 74 cooperatively engage to form the valve 68. The valve stem 72 has a cylindrical configuration with a plurality of differently sized outside diameters and a bore 76 extending through the valve stem 72 along the longitudinal axis 70. The valve stem 72 also has an aperture 78 extending laterally through an upper portion of the valve stem 72 substantially normal to the longitudinal axis 70 wherein the aperture 78 opens into and communicates with the longitudinally extending bore 76. Both the longitudinally extending bore 76 and the laterally extending aperture 78 aid in defining the passageway, which will further be described in detail below.

The valve stem 72 is slidably disposed in a bottom portion of the piston 44 with a portion of the valve stem 72 extending beyond the bottom of the piston 44. The piston 44 provides an annular shoulder 80 for abutting a complementary annular shoulder 82 of the valve stem 72 and prohibiting the valve stem 72 from extending beyond the annular shoulder 80 of the piston 44. Above the abutting shoulders 80, 82, the valve stem 72 provides an annular recess 84 and a flexible O-ring 86, disposed within the recess 84, for sealing the outer surface of the valve stem 72 with respect to the inner surface of the piston 44.

The valve head 74 has a cylindrical configuration with a bore 88 extending along the longitudinal axis 70 and an internal cylindrical sleeve 90 press-fit in the bore 88 of the valve head 74. The valve head 74 cooperatively engages the upper portion of the valve stem 72 by having the internal sleeve 90 of the valve head 74 coaxially receive the upper cylindrical portion of the valve stem 72 with respect to the longitudinal axis 70. The bottom surface 100 of the sleeve 90 abuts an annular shoulder 102 of the valve stem 72 thus eliminating downward travel of the valve head 74 with respect to the valve stem 72. The sleeve 90 has a radially extending flange 92 which cooperates with a flange 94 on the valve head 74 to define a recess for engaging and retaining an annular, flexible seal 98. The flexible seal 98 engages and disengages a shoulder 96 of the piston 44 to close and open the passageway, respectively.

In order for the seal 98 to open and close the passageway 39, the valve head 74 is also slidably disposed within the piston 44 along the longitudinal axis 70. The valve head 74 has a first periphery 104 that is slightly smaller than an internal bore 106 of the piston 44 so that the valve head 74 may slide with respect to the piston 44. The first periphery 104 of the valve head 74 has a circumferential recess 108 with a flexible O-ring 110 disposed within the recess 108 for sealing the first periphery 104 of the valve head 74 with respect to the corresponding surface defining the bore 106 of the piston 44. The valve head 74 provides a second periphery 112 that is smaller in diameter than the first periphery 104 of the valve head 74 to create an annular recess between the second periphery 112 of the valve head 74 and the internal surface defining the bore 106 of the piston 44. The annular recess helps define the passageway 39, which will be further described in detail below.

To provide vacuum above the valve head 74, a cylindrical valve cover 114 is disposed within the top portion of the piston 44. The piston 44 provides an inwardly extending shoulder 116 wherein the valve cover 114 is seated. The valve cover 114 provides a first circumferential recess 118 wherein a flexible O-ring 120 is disposed for sealing the outer circumferential surface of the valve cover 114 and an internal surface 122 defining the bore of the piston 44. The valve cover 114 is secured to the piston 44 by a plastic C-shaped retaining ring 124 wherein both the cylindrical valve cover 114 and the piston 44 have opposing annular recesses 126. Four small, equally spaced apertures 128 extend through the first periphery 46 of the piston 44 and into the recess 126 provided for the plastic retaining ring 124 of the valve cover 114. The C-shaped configuration of the retaining ring 124 allows the ring 124 to be compressed for assembly and disassembly while springing back to its natural, unbiased shape when released within the recess 126. The four apertures 128 are provided for receiving an assembly tool (not shown) which is inserted through the apertures 128 to push and compress the retaining ring 124 within the recess 126 of the valve cover 114 so that the valve cover 114 may be removed from the piston 44 for disassembly of the vacuum cup actuator 10, if desired.

The valve cover 114 also provides an undercut recess 130 in the bottom surface 132 of the valve cover 114. The recess 130 of the valve cover 114 is in communication with a small aperture 134 which extends through the top surface 135 of the valve head 74 and into the bore 88 of the valve head 74. The undercut recess 130 in the valve cover 114 is utilized to communicate vacuum and atmospheric pressure above the valve head 74 so as to manipulate motion of the valve head 74, as will be further described in detail below.

Figure 6:
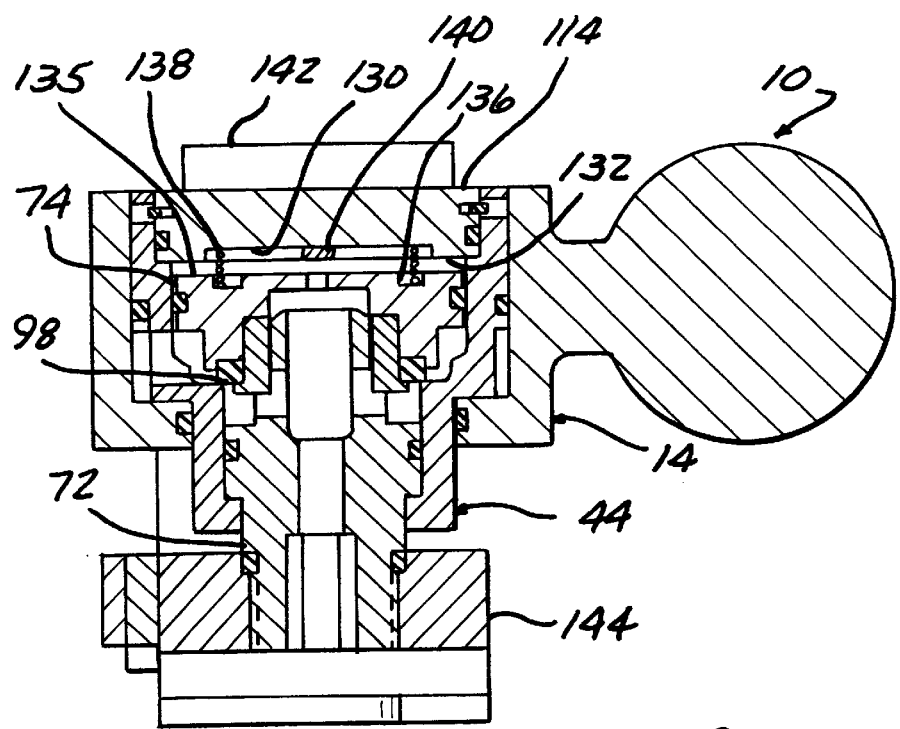
FIG. 6 is a cross-sectional view of a second embodiment wherein an axial compression spring biases the valve downward toward closing the passageway.
Figure 7:
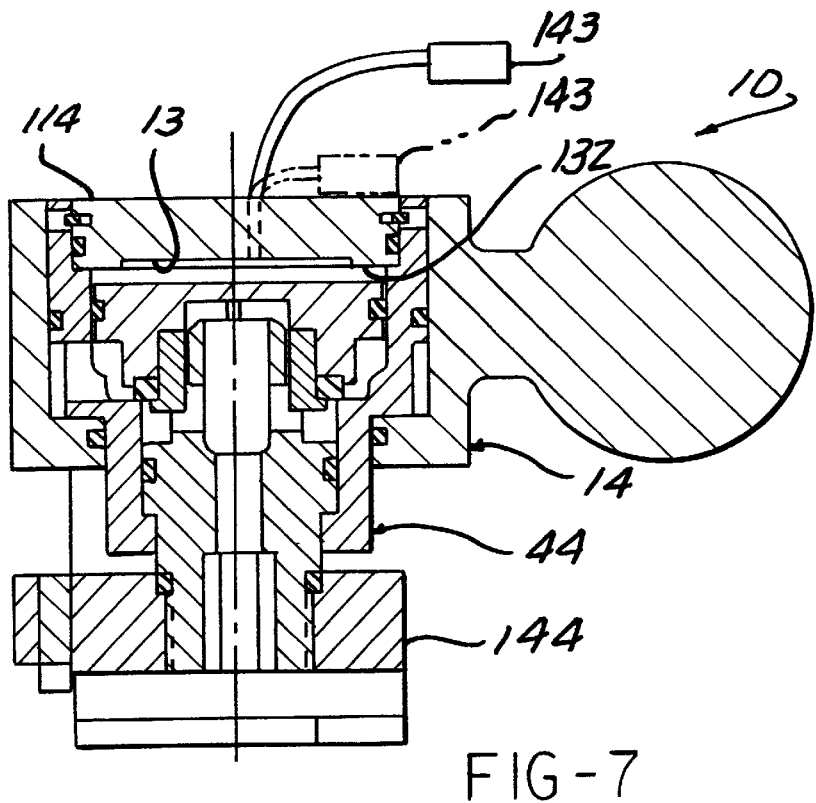
FIG. 7 is a cross-sectional view of the vacuum cup actuator showing a pressure sensor remotely communicating with the recess in the valve cover.

In a separate embodiment, an annular recess 136 may be provided in the top surface 135 of the valve head 74, as seen in FIG. 6. An axial compression spring 138 is seated within the annular recess 136 of the valve head for engagement between the valve head 74 and the bottom surface 132 of the valve cover 114 defining the undercut recess 130. The spring 138 provides a biasing force to the valve head 74 in the downward direction away from the valve cover 114 to ensure the resetting of the actuation means, as will be further described below.

To determine whether vacuum- is actuated, a pressure sensing means may be utilized, downstream from the flexible seal 98, to determine what pressure levels are realized by the vacuum cup 12. Preferably, a pressure sensor 140 is mounted within the undercut recess 130 provided in the bottom surface 132 of the valve cover 114, as seen in FIG. 6. The pressure sensor 140 provides a signal to a control means 142 which may be utilized to monitor and manipulate the supply of vacuum or pressurized air to the vacuum cup 12.

In order that the vacuum cup 12 may be quickly connected to and removed from the vacuum cup actuator 10, a quick connect mounting means provides a substantially rectangular bracket 144 having a threaded aperture 146 extending therethrough, as seen in FIGS. 1–5. A mating threaded region 148 at the bottom end of the valve stem 72 is threaded into the threaded aperture 146 of the bracket 144. A flexible O-ring 150 is provided at the top of the threaded region 148 of the valve stem 72 to provide a seal between the valve stem 72 and the mounting bracket 144. The mounting bracket 144 also provides a pair of opposing L-shaped flanges 152 integral with and continuing downwardly from side walls 154 of the mounting bracket 144. The flanges 152 define a rectangular slot 156 for receiving a mating, substantially rectangular plate 158 of the vacuum cup 12. The plate 158 of the vacuum cup 12 provides an aperture 160 extending therethrough for placing the bore 76 of the valve stem 74 in communication with the vacuum cup 12. To releasably latch the vacuum cup 12 to the bracket 144, portions of the flanges 152, which are substantially parallel with the bracket 144, taper inward such that a neck 162 of the vacuum cup 12, utilized for supporting the plate 158, cannot slide beyond the tapered portion of the flanges 152. A spring biased tooth or latch 164 in a front wall 166 of the bracket 144 provides a positive stop to the plate 158 of the vacuum cup 12 when disposed within the slot 156 of the bracket 144.

Figure 3:
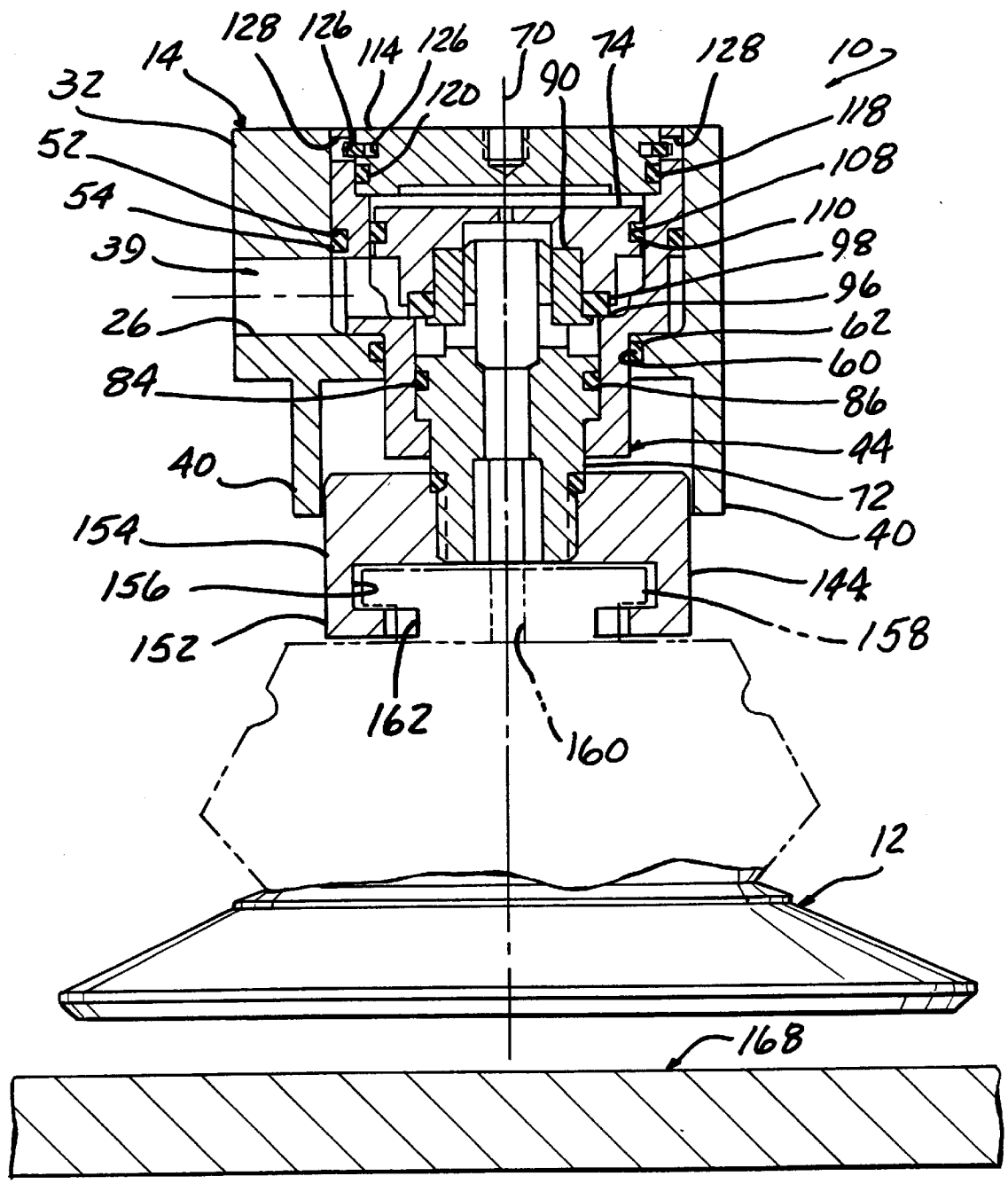
FIG. 3 is a cross-sectional view showing the vacuum cup disengaged from a workpiece and showing a valve closing the passageway and disengaging vacuum to the vacuum cup.
Figure 4:
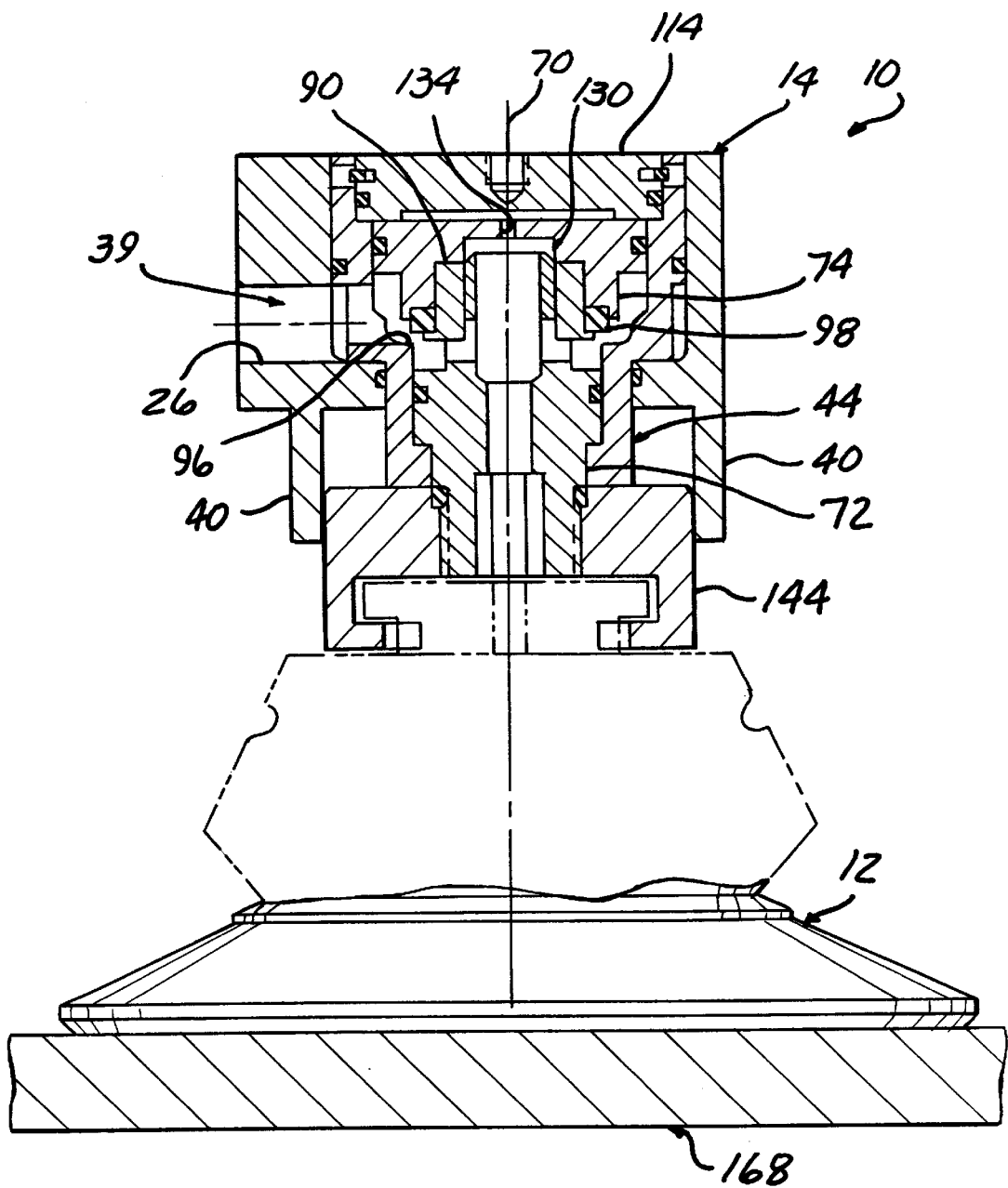
FIG. 4 is a cross-sectional view showing the vacuum cup engaging the workpiece and showing the passageway open to the valve to actuate vacuum to the vacuum cup.

In operation, the vacuum cup 12 of the vacuum cup actuator 10 may begin by being disengaged from a workpiece 168, and thus, vacuum is sealed off from the vacuum cup 12, as seen in FIG. 3. The vacuum cup actuator 10 is moved toward the workpiece 168 by the programmable robotic arm 24 so that the vacuum cup 12 may engage the workpiece 168. Once the workpiece 168 is engaged by the vacuum cup 12 and the robotic arm 24 moves the vacuum cup actuator 10 closer to the workpiece 168, the valve 68 slides upward with respect to the piston 44 and housing 14, and the flexible seal 98 disengages the shoulder 96 of the piston 44 to actuate vacuum throughout the passageway, as seen in FIG. 4. Thus, vacuum is applied in the vacuum cup 12 to secure the workpiece 168 to the vacuum cup 12.

Vacuum is also applied to the recess 130 provided in the bottom surface 132 of the valve cover 114 above the valve head 74. The vacuum in the recess 130 of the valve cover 114 pulls the valve head 74 upward in order to keep the passageway open. In contrast, vacuum applied to the piston 44 pulls the piston 44 downward within the housing 14. Therefore, absent any external forces, once the valve 68 opens the passageway and vacuum is actuated, the piston 44 becomes seated and fully disposed within the housing 14, and the top of the valve head 74 abuts the bottom surface 132 of the valve cover 114.

Figure 5:
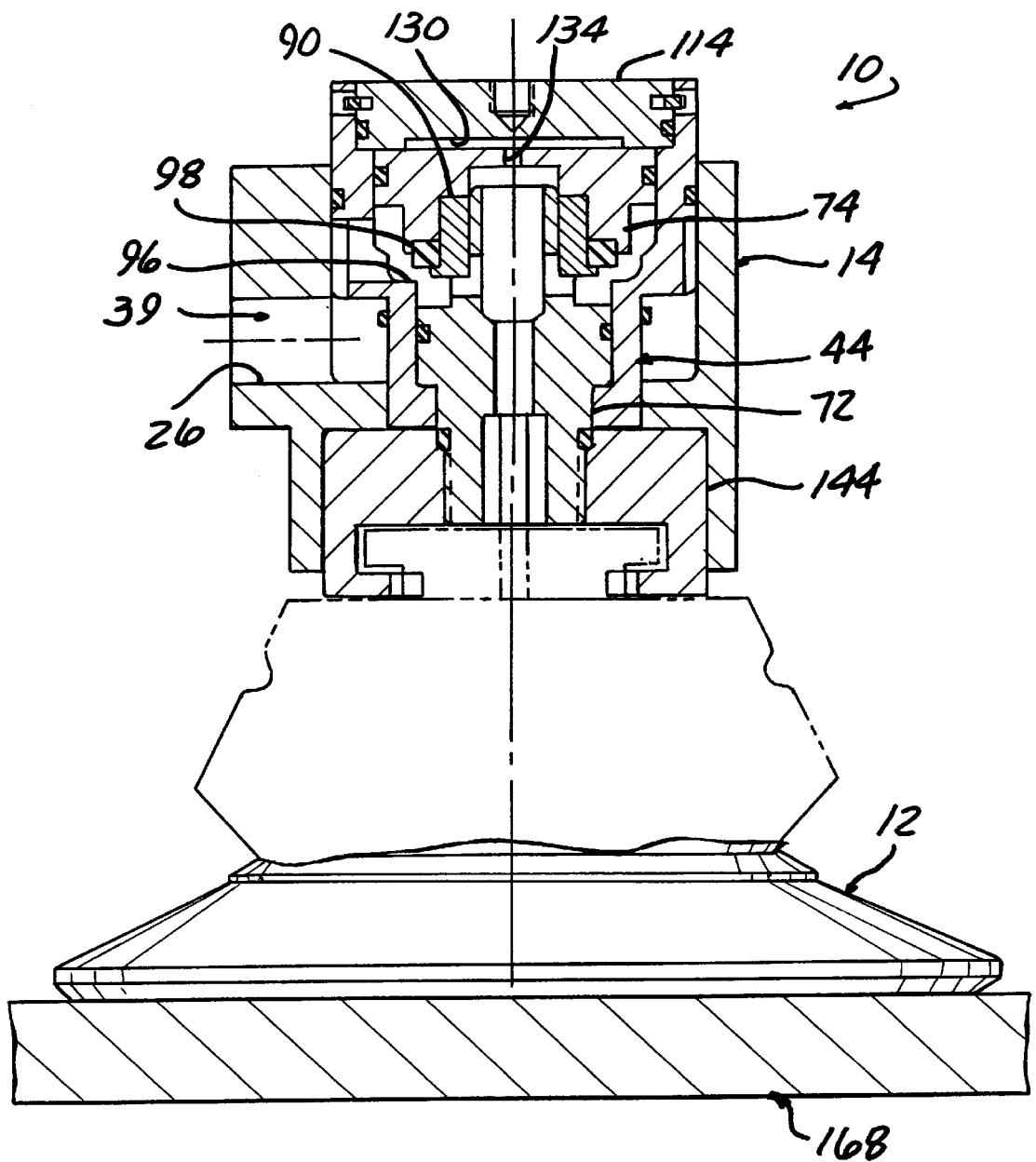
FIG. 5 is a cross-sectional view showing the vacuum cup engaging the workpiece and showing the passageway open to the valve for actuating vacuum to the vacuum cup while having the vacuum cup actuator compensate for overtravel of the vacuum cup with respect to the housing.

If the housing 14 of the vacuum cup actuator 10 is moved closer to the vacuum cup 12 than necessary to simply actuate vacuum and open the valve 68, then the vacuum cup 12 may force the entire piston 44, valve 68 and valve cover 114 beyond the large bore 36 of the housing 14, as seen in FIG. 5. This may occur due to irregularities in the geometry of the workpiece 168 or through positioning tolerances created by movements of the programmable robotic arm 24. Again, after the piston 44 extends beyond the housing 14, vacuum will pull the piston 44 back into the housing 14 and maintain the valve 68 in the open position. Thus, vacuum is always provided to the vacuum cup 12 compensating for any minor air leakages in the vacuum cup 12.

When the workpiece 168 is to be released, the supply of vacuum is turned off, and a supply of pressurized air is applied to the inlet port 26 of the housing 14. The entire passageway is quickly pressurized to atmospheric pressure, and the workpiece 168 disengages the vacuum cup 12 due to the lack of vacuum or suction as well as the pressurized supply of air forcing the workpiece away from the vacuum cup. The continual flow of pressurized air maintains the valve 68 in the open position until vacuum is reapplied.

Thus, the vacuum cup actuator 10 may be reset by turning off the supply of vacuum, turning on and off the supply of pressurized air to release the workpiece 168, and reenergizing the supply of vacuum to the inlet of the housing-14. Once vacuum is reactuated, the valve 68 is drawn downward by vacuum, and the flexible seal 98 engages the shoulder 96 of the piston 44 to close the passageway, as seen in FIG. 3. Thus, the remainder of the passageway is at atmospheric pressure since the vacuum cup 12 is not engaged with the workpiece 168. The vacuum cup actuator 10 is then set to be reactuated by the vacuum cup 12 engaging the workpiece 168 and moving with respect to the housing 14.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for applying and releasing a vacuum and a pressurized fluid to a workpiece engaging vacuum cup comprising:
   means for housing a common passageway for communicating said vacuum and said pressurized fluid to said vacuum cup; and
   means for actuating said vacuum in response to the relative position of said vacuum cup with respect to said housing means; and
   means for resetting said actuating means wherein said pressurized fluid is introduced to said passageway for releasing said vacuum from said vaccum cup.

2. The apparatus stated in claim 1, wherein said actuating means comprises:
   valve means, slidably disposed within said housing means, for opening and closing said passageway in response to the relative position of said vacuum cup with respect to said housing means wherein said vacuum cup engages a workpiece.

3. The apparatus stated in claim 1, further comprising:
   quick connect means for releasably mounting said vacuum cup to said actuating means.

4. The apparatus stated in claim 1, further comprising:
   means, integral with said housing means, for mounting said housing means to means for manipulating motion.

5. The apparatus stated in claim 1, further comprising:
   means for sensing pressure realized by said vacuum cup.

6. An apparatus for applying and releasing a vacuum to a workpiece engaging vacuum cup comprising:
   means for housing a passageway for communicating said vacuum to said vacuum cup; and
   means for actuating said vacuum in response to the relative position of said vacuum cup with respect to said housing means;
   said actuating means comprising a valve means, slidably disposed within said housing means, for opening and closing said passageway in response to the relative position of said vacuum cup with respect to said housing means wherein said vacuum cup engages a workpiece; and
   wherein said valve means comprises:
      a piston slidably disposed within said housing means;
      a valve slidably disposed within said piston for relative movement therein;
      said passageway extending through said piston and said valve to said vacuum cup; and
      means, within said passageway, for releasably sealing said valve with respect to said piston wherein said sealing means opens and closes said passageway.

7. An apparatus for applying and releasing a vacuum to a workpiece engaging vacuum cup comprising:
   means for housing a passageway for communicating said vacuum to said vacuum cup;
   means for actuating said vacuum in response to the relative position of said vacuum cup with respect to said housing means;
   said actuating means comprising a valve means slidably disposed within said housing means, for opening and closing said passageway in response to the relative position of said vacuum cup with respect to said housing means wherein said vacuum cup engages a workpiece; and
   said valve means comprising:
      a piston slidably disposed within said housing means;
      a valve slidably disposed within said piston for relative movement therein;
      said passageway extending through said piston and said valve to said vacuum cup; and
      means, within said passageway, for releasably sealing said valve with respect to said piston wherein said sealing means opens and closes said passageway; and
   said releasable sealing means comprising: a flexible seal circumferentially connected to said valve for engaging and disengaging said piston so as to close and open, respectively, said passageway.

8. An apparatus for applying and releasing a vacuum and a pressurized fluid to a workpiece engaging vacuum cup comprising:

a housing having at least one port for receiving said vacuum and said pressurized fluid, and said housing having a passageway extending from said port to said vacuum cup;

valve means, slidably disposed within said housing, for actuating said vacuum in response to the relative position of said vacuum cup with respect to said housing; and means for resetting said actuating valve means wherein said pressurized fluid is introduced through said port of said housing to release said vacuum from said vacuum cup.

9. The apparatus stated in claim 8, wherein said actuating valve means comprises:

a piston slidably disposed within said housing;

a valve slidably disposed within said piston for relative movement therein;

a valve cover connected to said piston;

said passageway extending through said piston and said valve to said vacuum cup; and a flexible seal circumferentially connected to said valve for engaging and disengaging a shoulder of said piston for closing and opening, respectively, said passageway.

10. The apparatus stated in claim 9, wherein said valve further comprises:

said valve having a longitudinal bore extending therethrough and communicating with said vacuum cup, and said valve having a laterally disposed aperture extending therethrough and communicating with said longitudinal bore; and said valve cover having a recessed portion in communication with said longitudinal bore of said valve.

11. The apparatus stated in claim 10, further comprising:

quick connect means for releasably mounting said vacuum cup to said valve.

12. The apparatus stated in claim 9, further comprising:

means, disposed within said valve, for sensing pressure realized by said vacuum cup.

13. The apparatus stated in claim 8, further comprising:

bracket means, integral with said housing, for mounting said housing means to programmable means for manipulating motion.

14. An apparatus for applying and releasing a vacuum to a workpiece engaging vacuum cup comprising:

a housing having a cylindrical aperture extending therethrough and an inlet port for receiving and communicating a supply of vacuum to said cylindrical aperture;

a piston slidably disposed within said cylindrical aperture of said housing, and said piston having a stepped bore extending longitudinally therethrough and an aperture extending through a side wall of said piston in communication with said inlet port of said housing;

a valve slidably disposed within said stepped bore of said piston, and said valve having a longitudinally extending bore extending therethrough and communicating with said vacuum cup, and said valve having an aperture extending through a side wall of said valve in communication with said longitudinally extending bore of said valve;

a valve cover connected to an end of said piston for closing said longitudinally extending bore of said piston, and said valve cover having a recess in communication with said longitudinally extending bore of said valve; and a flexible seal circumferentially connected to said valve for opening and closing a passageway defined by said inlet port of said housing, said aperture of said piston and said aperture of said valve wherein said flexible seal releasably engages a valve seat of said piston wherein said vacuum is actuated in response to the relative position of said vacuum cup with respect to said housing.

15. The apparatus stated in claim 14, further comprising:

means for resetting actuation of said vacuum wherein a supply of pressurized fluid is introduced through said port of said housing to release said vacuum from said vacuum cup; and said supply of vacuum is reintroduced after said workpiece is released from said vacuum cup wherein said flexible seal closes said passageway.

16. The apparatus stated in claim 14, further comprising:

quick connect means for releasably mounting said vacuum cup to said valve.

17. The apparatus stated in claim 14, further comprising:

bracket means, integral with said housing, for mounting said housing means to a programmable robotic arm.

18. The apparatus as stated in claim 14, further comprising:

means, disposed within said recess of said valve cover, for sensing the pressure realized by said vacuum cup.

* * * * *